US010641921B1

(12) United States Patent
Venter et al.

(10) Patent No.: US 10,641,921 B1
(45) Date of Patent: May 5, 2020

(54) SYSTEM AND METHOD FOR WELL LOG ANALYSIS

(71) Applicant: DATAINFOCOM USA, INC., Austin, TX (US)

(72) Inventors: Frederick Johannes Venter, Driftwood, TX (US); Atanu Basu, Austin, TX (US)

(73) Assignee: DataInfoCom USA, Inc., Austin, TX (US)

( * ) Notice: Subject to any disclaimer, the term of this patent is extended or adjusted under 35 U.S.C. 154(b) by 302 days.

(21) Appl. No.: 14/289,569

(22) Filed: May 28, 2014

Related U.S. Application Data

(60) Provisional application No. 61/828,559, filed on May 29, 2013.

(51) Int. Cl.
*G06K 9/00* (2006.01)
*G01V 9/00* (2006.01)

(52) U.S. Cl.
CPC .......... *G01V 9/00* (2013.01); *G06K 9/00476* (2013.01)

(58) Field of Classification Search
None
See application file for complete search history.

(56) References Cited

U.S. PATENT DOCUMENTS

| | | |
|---|---|---|
| 6,876,988 B2 | 4/2005 | Helsper et al. |
| 6,917,928 B1 | 7/2005 | Pellinat |
| 7,373,633 B2 | 5/2008 | Kraiss et al. |
| 7,979,380 B2 | 7/2011 | Moyne et al. |
| 8,200,527 B1 | 6/2012 | Thompson et al. |
| 8,209,218 B1 | 6/2012 | Basu et al. |
| 8,209,275 B2 | 6/2012 | Tsui et al. |
| 8,364,519 B1 | 1/2013 | Basu et al. |
| 8,738,425 B1 | 5/2014 | Basu et al. |

(Continued)

OTHER PUBLICATIONS

Josh Flood: "Detailed Stratigraphic Study of the Rose Run Sandstone in Coshocton, Holmes and Tuscarawas Counties, Ohio: A Potential Carbon Dioxide Injection Horizon" Submitted in partial fulfillment of the requirements for the Bachelor of Science Degree at The Ohio State University, 2011, pp. 1-23.*

(Continued)

*Primary Examiner* — Wei Wen Yang
(74) *Attorney, Agent, or Firm* — Chad Peterson

(57) ABSTRACT

An exemplary method of analyzing a well log includes imaging a well log to form a well log image, performing pattern recognition on the well log image to determine pattern data, and determining stratigraphic structure data based on the pattern data. Another exemplary method of improving production from a stratigraphic structure includes performing pattern recognition on a well log image stored in an image format to determine pattern data, determining stratigraphic structure data using a computer-based structure analyzer based on the pattern data, and projecting well parameters based on the stratigraphic structure data. An exemplary system includes a scanner to scan a raster image of a printed well log and a computational system in communication with the scanner to receive the raster image. The computational system includes a pattern recognition analyzer to determine pattern data from the raster image and a structure analyzer to determine stratigraphic structure based on the pattern data.

20 Claims, 9 Drawing Sheets

(56) References Cited

U.S. PATENT DOCUMENTS

| | | |
|---|---|---|
| 2001/0034628 A1 | 10/2001 | Eder |
| 2002/0006192 A1 | 1/2002 | Bengtson et al. |
| 2002/0049621 A1 | 4/2002 | Bruce |
| 2002/0049687 A1 | 4/2002 | Helsper et al. |
| 2003/0177060 A1 | 9/2003 | Seagraves |
| 2004/0068429 A1 | 4/2004 | MacDonald |
| 2004/0068431 A1 | 4/2004 | Smith et al. |
| 2004/0148047 A1 | 7/2004 | Dismukes et al. |
| 2005/0004834 A1 | 1/2005 | Smith |
| 2006/0010164 A1 | 1/2006 | Netz et al. |
| 2006/0101017 A1 | 5/2006 | Eder |
| 2006/0229921 A1 | 10/2006 | Colbeck |
| 2006/0242033 A1 | 10/2006 | Corbett |
| 2006/0242035 A1 | 10/2006 | Corbett et al. |
| 2007/0106593 A1 | 5/2007 | Lin |
| 2007/0129893 A1 | 6/2007 | McColl et al. |
| 2007/0150324 A1 | 6/2007 | Makita et al. |
| 2008/0004922 A1 | 1/2008 | Eder |
| 2008/0027769 A1 | 1/2008 | Eder |
| 2008/0104104 A1 | 5/2008 | Nolan et al. |
| 2008/0140623 A1 | 6/2008 | Tien et al. |
| 2008/0183786 A1 | 7/2008 | Shimizu |
| 2008/0195440 A1 | 8/2008 | Bagchi et al. |
| 2008/0201397 A1 | 8/2008 | Peng et al. |
| 2008/0243912 A1 | 10/2008 | Azvine et al. |
| 2009/0064025 A1 | 3/2009 | Christ et al. |
| 2009/0138334 A1 | 5/2009 | Henby et al. |
| 2009/0319931 A1 | 5/2009 | Hutchings et al. |
| 2009/0171879 A1 | 7/2009 | Bullen et al. |
| 2009/0217183 A1 | 8/2009 | Moyne et al. |
| 2010/0077077 A1 | 3/2010 | Devitt |
| 2010/0114899 A1 | 5/2010 | Guha |
| 2010/0274637 A1 | 10/2010 | Li et al. |
| 2010/0332439 A1 | 12/2010 | Adachi |
| 2011/0071867 A1 | 3/2011 | Chen et al. |
| 2011/0213644 A1 | 9/2011 | Phene |
| 2013/0289962 A1* | 10/2013 | Wendt ................. G01V 1/28 703/10 |
| 2014/0035912 A1* | 2/2014 | Thorne ............... G06T 17/05 345/420 |
| 2014/0067353 A1* | 3/2014 | Shelley .............. E21B 43/26 703/10 |
| 2014/0244552 A1* | 8/2014 | Liu ................... G06N 99/005 706/12 |
| 2014/0254884 A1* | 9/2014 | Elkington ........... G01V 1/42 382/109 |

OTHER PUBLICATIONS

"Altaworks Selected by Industry Influencers to Demonstrate at DEMO 2002 Conference"; Business/Technology Editors; Business Wire; New York; Jan. 16, 2002; p. 1; Proquest.

"Fonterra Canpac Deploys Pavilion's Production Performance Management Solution: Fast Moving Consumer Goods Manufacturer Improves Operational Performance and Reduces Waste"; Business Wire; New York; May 23, 2006; p. 1; Proquest.

"Performance -Measurement & Small to Mid-sized Call Center Solutions"; Call Center Solutions; Mar. 1999; 17, 9; ProQuest Central; p. 22.

"Predictive Analysis with SQL Server 2008"; White Paper; Microsoft SQL Server 2008 R2; Nov. 2007.

Bauer; "Predictive Analytics: Data Mining with a Twist"; DM Review 15.12; Dec. 2005; p. 76.

Bauer; "Predictive Analytics: The Next Wave in KPI's"; DM Review; Nov. 2005.

Cheisa et al; "How do measurement objectives influence the R&D performancee measurement system design:"; Management Research News; 30(3); pp. 182-202; doi:10.1108/01409170710733269.

Colias; "New Statistical Tools for Key Driver Analysis"; Decision Analyst; 2007.

Fair Isaac Corp.; Decision Management Tools-Xpress OptiMIzer; Product Sheet; 2008; 2 Pgs.

Fair Isaac Corporation; "Predictive Analytics: Custom Insurance Analytics"; Product Sheet; 2008; 2 pages.

Frangopol et al.; "Probabilitic Performance Prediction of Deteriorating Structures Under Different Maintenance Strategies: Condition, Safety and Cost"; Apr. 2004.

Holland; "Achieving a step change in contact centre performance: Exploiting data to make better decisions and take effective action"; Journal of Targeting, Measurement and Analysis for Marketing, vol. 12, 2, pp. 103-113.

Keeley; "Root Cause Analysis Research Corner Cause and Effect"; Call Center Magazine; Mar. 2005.

Lawson et al; "Socrecards and dashboards-partners in performance"; CMA Management; Dec./Jan. 2007.

Loucks; "Model Sensitivity and Uncertainty Analysis"; Water Resources Planning and Management; UNESCO; 2005; http://ecommons.library.cornell.edu/bitstream/1813/2804/12/09_chapter09.pdf.

Marr; "Measuring and managing intangible value drivers"; Business Strategy Series; 8(3); 2007; pp. 172-178.

Palfreyman;"Performance Indicators and Reporting: Some practical guidelines"; 1998; Charter. 69 (4), pp. 85-86.

SAS Institute Inc., "How to Compete on Analytics: The Analyitical Center for Excellence"; White Paper; 2008; 18 pages.

SAS Institute Inc., Ngenera Corporation, and Intel; "Sucessful Automating Decisions with Business Analytics: How to Identify High-Value Opportunities for Embedding Analytics into Your Business Processes"; White Paper; 2008; 22 pages.

SAS Institute Inc.; Enhancing Sales and Operations Planning with Forecasting; White Paper; 2008; 14 pages.

SAS Institute: "Data Driven Decision Making: Analyzing Your Data to Improve Student Learning"; White Paper; 2008; 19 pages.

SAS Institute; "Data Management for Risk: The Importance of Data for Effective Risk Management"; White Paper; 2009; 11 pages.

SAS Institute; "The SAS Enterprise Intelligence Platform: SAS Business Intelligence; Enabling BI Consolidation and Standardization Without Comprises"; White Paper; 2008; 13 pages.

SPSS Inc.; "Clementine® 12.0 Specifications; Achieve Better Insight and Prediction with Data Mining"; Product Specificiations; 2008; 6 pages.

SPSS Inc.; "Get More Out of Your Analyitical Investment"; Advertisement; 2008; 2 pages.

Wen et al.; "Utilizing the Balanced Scorecard for Performance Measurement of Knowledge Management"; Journal of Accounting, Finance & Management Strategy, 3(2), pp. 39-58.

* cited by examiner

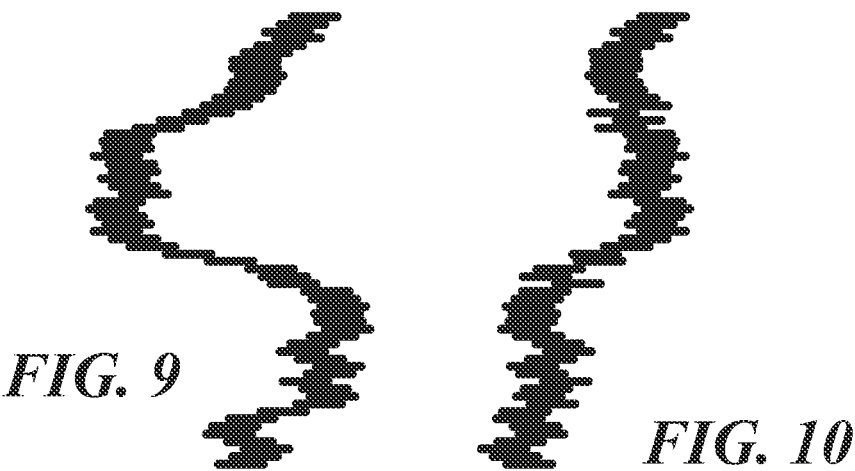
FIG. 9
FIG. 10
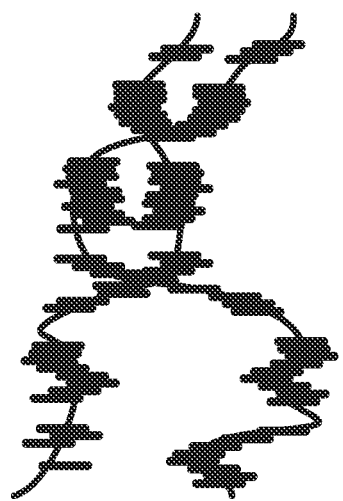
FIG. 11

SYSTEM AND METHOD FOR WELL LOG ANALYSIS

CROSS REFERENCE TO RELATED APPLICATION

This application claims benefit of U.S. Provisional Patent Application No. 61/828,559, filed on 29 May 2013 and having the same title, each of which is incorporated herein by reference.

FIELD OF THE DISCLOSURE

This disclosure, in general, relates to systems and methods for analyzing well logs.

BACKGROUND

Wells are drilled for variety of reasons including production of an underground resource, generating or disposal of heat, or for waste disposal. For example, wells may be drilled to access stratigraphic structures to produce water, oil, or hydrocarbon gas. In another example, wells are drilled into salt containing structures for use in liquid extraction of salt. In a further example, wells can be used to dispose of liquid waste. In addition, wells can be utilized for capturing geothermal energy or for disposing waste heat from cooling applications.

In each case, wells are generally drilled through stratigraphic layers in rock formations. Each stratigraphic structure has different properties, such as density, porosity, permeability, rock type, hardness, salinity, or moisture content, among others. In addition, some of the stratigraphic structures can include liquids or gases, such as oil or hydrocarbon gases.

To characterize the stratigraphic structures, well logging techniques have been developed. In particular, well logging techniques have been under development since the 1920s. As such, many well logging techniques were developed long before the availability of portable computers and compact digital storage. Early well logs include graphs printed on paper.

SUMMARY

Systems and methods are presented for determining stratigraphic structure data from well logs provided in printed or image formats. Such stratigraphic structure data can be used to form field models, project productions values, or suggest well completion parameters.

BRIEF DESCRIPTION OF THE DRAWINGS

The present disclosure may be better understood, and its numerous features and advantages made apparent to those skilled the art by referencing the accompanying drawings.

FIG. 6, FIG. 7, FIG. 8, FIG. 9, FIG. 10, and FIG. 11 include illustrations of exemplary analysis of a well log trace image.

The use of the same reference symbols in different drawings indicates similar or identical items.

DETAILED DESCRIPTION

Recent advances in drilling and production techniques have led to renewed interest in older production structures. However, well log data associated with older wells drilled into such production structures are stored on printed tape well logs showing the well log in a graph format often on physical paper. It is been discovered that converting such well logs into paired data (e.g., data associating a depth or length with a digital value of a log readout) has proven difficult. In contrast, systems and methods for analyzing stratigraphic structures directly from images of the well logs or from well logs stored in an image format are described.

Figure 1:
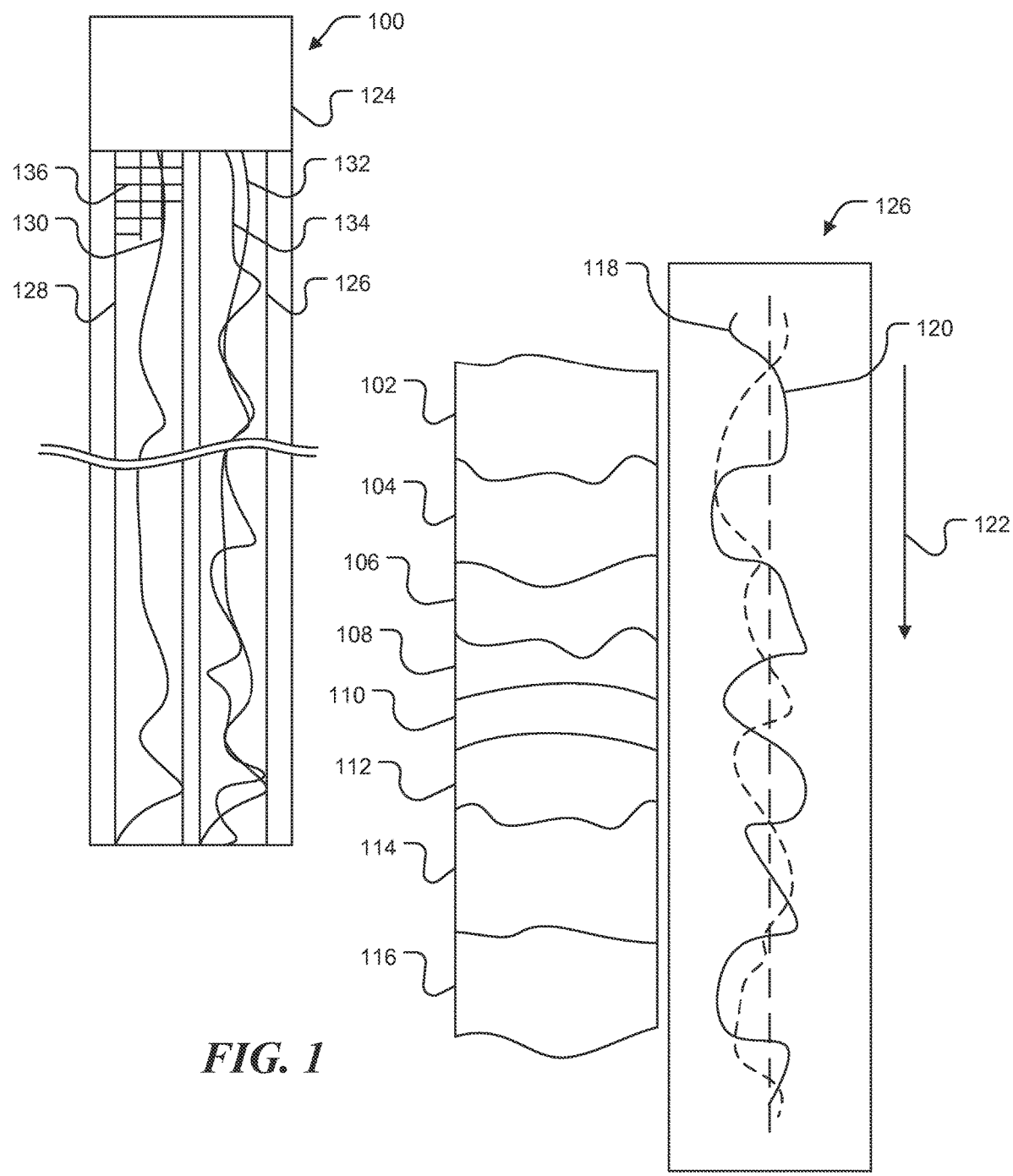
FIG. 1 includes an illustration of an exemplary well log associated with stratigraphic structures.

As illustrated in FIG. 1, a well log 100 includes a legend 124 and one or more graphs (e.g., graphs 126 or 128). The legend 124 can include information printed in alphanumeric symbols, barcoded symbols, another special representation, or a combination thereof. The information can include data associated with identification of a well, the types of testing represented by the graphs (e.g., graphs 126 or 128), parameters associated with the graphs (e.g., graphs 126 or 128), a date, a time, a starting depth, geographical formation identifiers, or a combination thereof. Regarding the one or more graphs (e.g., graphs 126 or 128), the legend 124 can include information such as a starting depth, a value range associated with the individual graphs, details about the grid dimensions, other parameters associated with the testing technique, or any combination thereof.

The graphs 126 or 128 can include one or more traces. Each trace can be associated with measurements using different testing techniques or values calculated from different testing data. As illustrated, the graph 128 includes a single trace 130. Each graph can include one or more traces. For example, the graph 126 includes two traces 132 or 134. In addition, each graph can include a grid providing a reference for determining a domain and range pair for each data point. While the grid 136 is illustrated for part of the graph 128, the grid can extend throughout each graph 126 or 128 and can have different spacings for each graph. In particular, each grid can define a cell based on the spacing of grid lines along the domain and the spacing of grid lines along the range of the graph. Such grid line spacings or cell dimensions can be provided within the legend 124. In another example, a user can provide the system with the grid cell dimensions.

In particular, the graph 126 includes a graphical depiction of a measured value 118 relative to distance or depth 122. The measured values 118 vary in accord with properties of stratigraphic structures, such as stratigraphic structures 102, 104, 106, 108, 110, 112, 114, or 116, passed by a logging tool when creating a well log. The measured values 118 can be derived from measures of resistivity, impedance, acoustic impedance, gamma ray or neutron radiation, spontaneous potential differences, caliper measurements, nuclear magnetic resonance, or a combination thereof, among others.

A graph (e.g., the graph 126) can include more than one graphed value, such as a second value 120 platted relative to distance or depth 122. The second value 120 can be graphed to overlap the first measured value 118 or can be included in a separate adjacent graph. While only two graphed values 118 or 120 are illustrated, a well log can include more than one graphed value, such as two values, three values, four values or more.

As such, in a printed well log, the data is presented in a graph image. Such data is to be contrasted with digitally stored paired data in which a value is stored as a digital value associated with a depth or distance. Printed graphical well logs can be scanned into a system as an image file, such as a raster file, and can be processed to recognize patterns within the images without converting the well logs to paired digital data.

Figure 2:
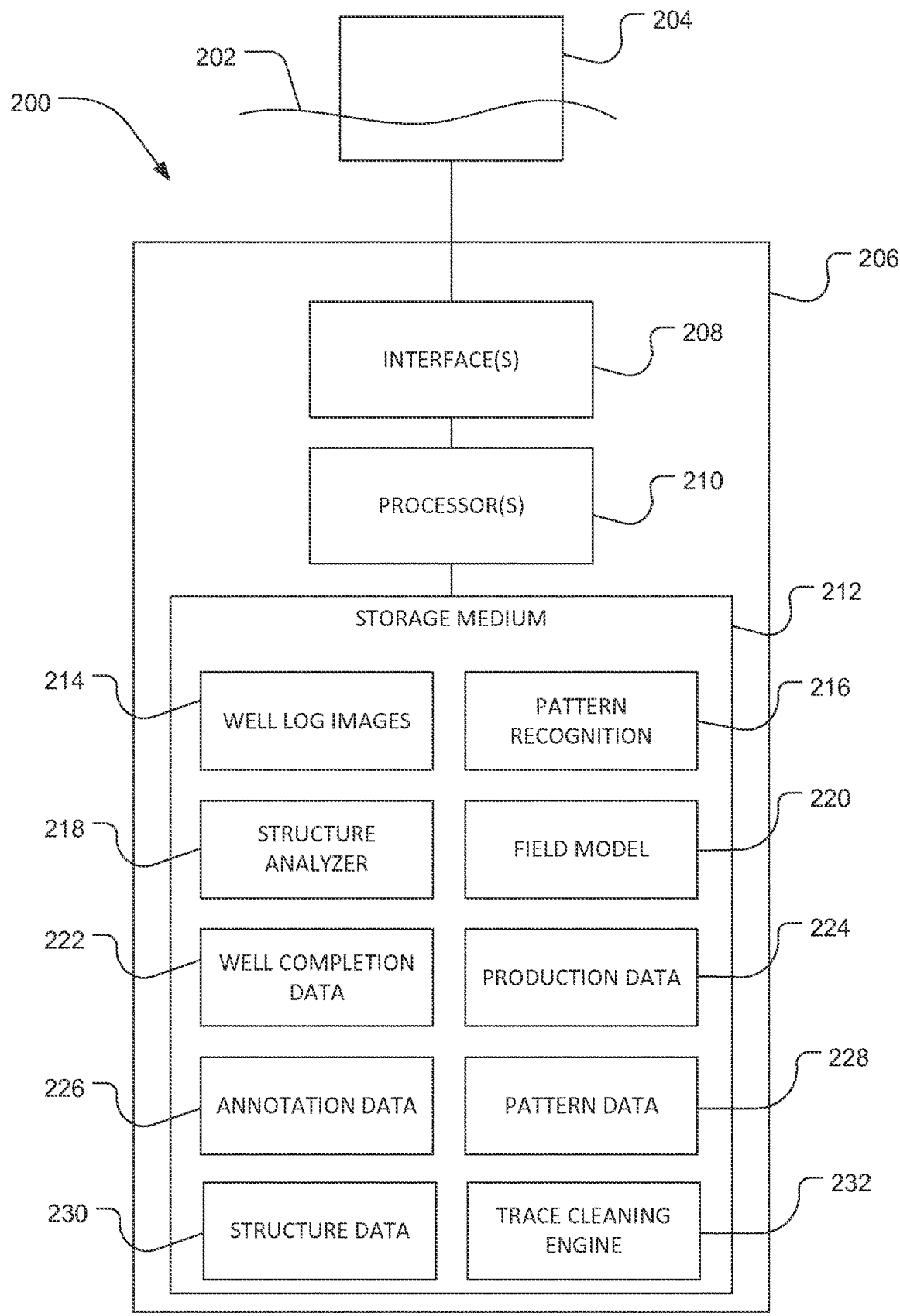
FIG. 2 includes an illustration of exemplary well log analysis system.

As illustrated in FIG. 2, a system 200 includes a scanner 204 and a computational system 206. The printed well log 202 can be scanned by the scanner 204 and provided to the computational system 206 as a raster image or in another image format via the interfaces 208. The scanner 204 can use optical technologies that use one or more of various wavelengths to enhance imaging of the well log. Such wavelengths include infrared, visible spectrum, ultraviolet wavelengths, or a combination thereof.

The scanner 204 communicates with the computational system 206 through interfaces 208. The interfaces 208 can be parallel, serial, or other interfaces, or a combination thereof. The computational system 206 can further include network interfaces, user interfaces, printer interfaces, or various other interfaces. The computational system 206 also includes one or more processors 210. Such processors 210 can be in communication with the interfaces 208 and storage medium or media 212. The storage medium 212 can include non-transitory medium for storing instructions and data. Alternatively, the storage medium 212 is separated into different physical devices. While the computational system 206 is illustrated as a single unit, one or more of the components can be separated into different housings or can communicate with other components within the system by a network, such as a local area network, wide-area network, a global network, or a combination thereof.

The storage medium or media 212 can include well log images 214. In particular, such well log images are stored in an image format in contrast to paired digital data. Exemplary image formats include bitmap, GIF, JPEG, MPEG, PNG, or PDF, among others, or combination thereof. The physical well logs 202 can be scanned by the scanner 204 and processed through the interfaces 208 and processor 210 to be stored in an image format as well log images 214. Optionally, a trace cleaning engine 232 can further process the well log images 214 to remove grid lines or perform noise reduction.

In a further example, the storage media or medium 212 can include instructions for pattern recognition engine 216 and stored pattern data 228. Pattern recognition can be performed on the well log images 214 utilizing the images in an image format in contrast to reading paired digital data. Annotated data 226 can be used to train the pattern recognition engine 216.

Such pattern data 228 derived by pattern recognition can be processed using a structure analyzer 218 to determine stratigraphic structured data 230. Stratigraphic structure data can include structure demarcations, material type, parameters such as porosity, density, or a measure of fracturing, the presence and type of fluid, or a combination thereof, among others. Such stratigraphic structured data 230 can be stored in the storage medium 212.

Using the stratigraphic structured data 230, a field model 220 can be developed. The structure analyzer 218 or the field model 220 can be used to project production data or suggest well related parameters such as projected production values or suggested well completion parameters. In particular, the structure analyzer 218 can be trained with well completion data 222, historical production data 224, annotated data 226, along with pattern data 228. For example, the structure analyzer 218 can be trained with annotated data 226 and pattern data 228 to identify rock properties or the presence and type of fluid within a stratigraphic structure. In an example, a structure analyzer 218 trained with pattern data 228, well completion data 222, and annotated data 226 can suggest well completion parameters. Exemplary well completion data includes drilling techniques, perforation types, number perforation, number boreholes, or well treatment parameters such as hot oil treatment or fracturing treatment parameters. In a further example, the structure analyzer 218 can be trained with production data 224 and can project production values. Production data 224 can include historical production data, or oil, water or gas production maximums, average production values, or a combination thereof.

Figure 3:
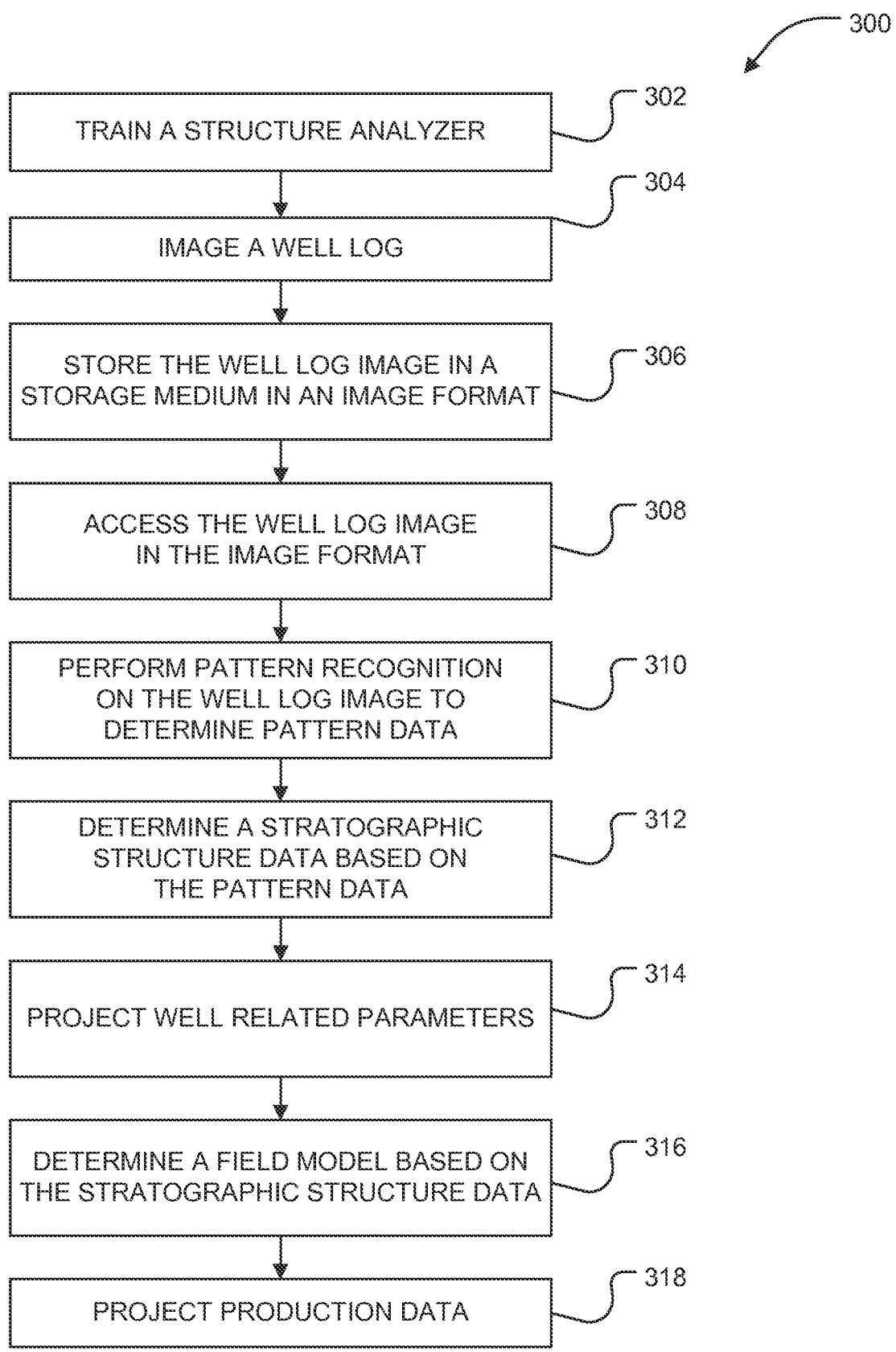
FIG. 3, FIG. 4, and FIG. 5 include block flow diagrams illustrating exemplary methods for well log analysis.

FIG. 3 includes an illustration of an exemplary method 300 that includes training the pattern recognition engine or the structure analyzer, as illustrated at 302. Depending upon the nature of the training, the pattern recognition engine or the structure analyzer can be utilized to identify stratigraphic structured data and can optionally be used to project or suggest well related parameters, such as project production parameters or suggest well completion parameters. The pattern recognition engine or the structure analyzer is trained using pattern data along with other annotated data and optionally production data or well completion data.

As illustrated at 304, a well log is imaged to provide raster images from scans or faxes in contrast to digitizing the well log to form paired digital data. Optionally, the well log can be imaged using more than one imaging technique at one or more wavelengths. The well log images can be stored in a non-transitory storage medium in an image format, as illustrated at 306. The image format can include bitmap, GIF, JPEG, MPEG, PNG, or PDF, among others, or combination thereof. The non-transitory storage medium can include magnetic storage medium, optical storage medium, solid-state storage medium, or various other forms of RAM or ROM, or combination thereof.

A well log image in the image format can be accessed from the storage medium, as illustrated at 308. Optionally, the well log image can be processed to filter noise or clean the image. The noise-reduced well log raster image can be provided for pattern recognition to determine pattern data, as illustrated at 310.

As pattern data is determined, particularly pattern data from more than one well log value trace, a structure analyzer can determine a stratigraphic structure data based on the pattern data, as illustrated at 312. The stratigraphic structured data can include the identification of rock types or rock properties within a stratigraphic structure, or fluid or fluid type within the stratigraphic structure. While the structure analyzer is described separately from pattern recognition, both functions can be performed in a single logical analyzer or the functions can be further subdivided into more than one analyzer.

Depending upon the training of the structure analyzer, the system can project well related parameters, as illustrated 314. In an example, a well related parameter includes a projection of production of a fluid or gas from the stratigraphic structure. In another example, the well related parameter can include parameters for completing a well, such as suggested treatments or perforations of the well bore within the stratigraphic structure.

Optionally, the system can determine a field model based on the stratigraphic structured data, as illustrated at 316. In particular, well logs of several wells drilled within the same region can be utilized together in conjunction with relative positioning of the wells to determine a field model. Such field models can provide a three-dimensional characterization of the production structure and further facilitate projection of production data, as illustrated at 318, or projection of total available production fluid, such as oil or gas.

Figure 4:
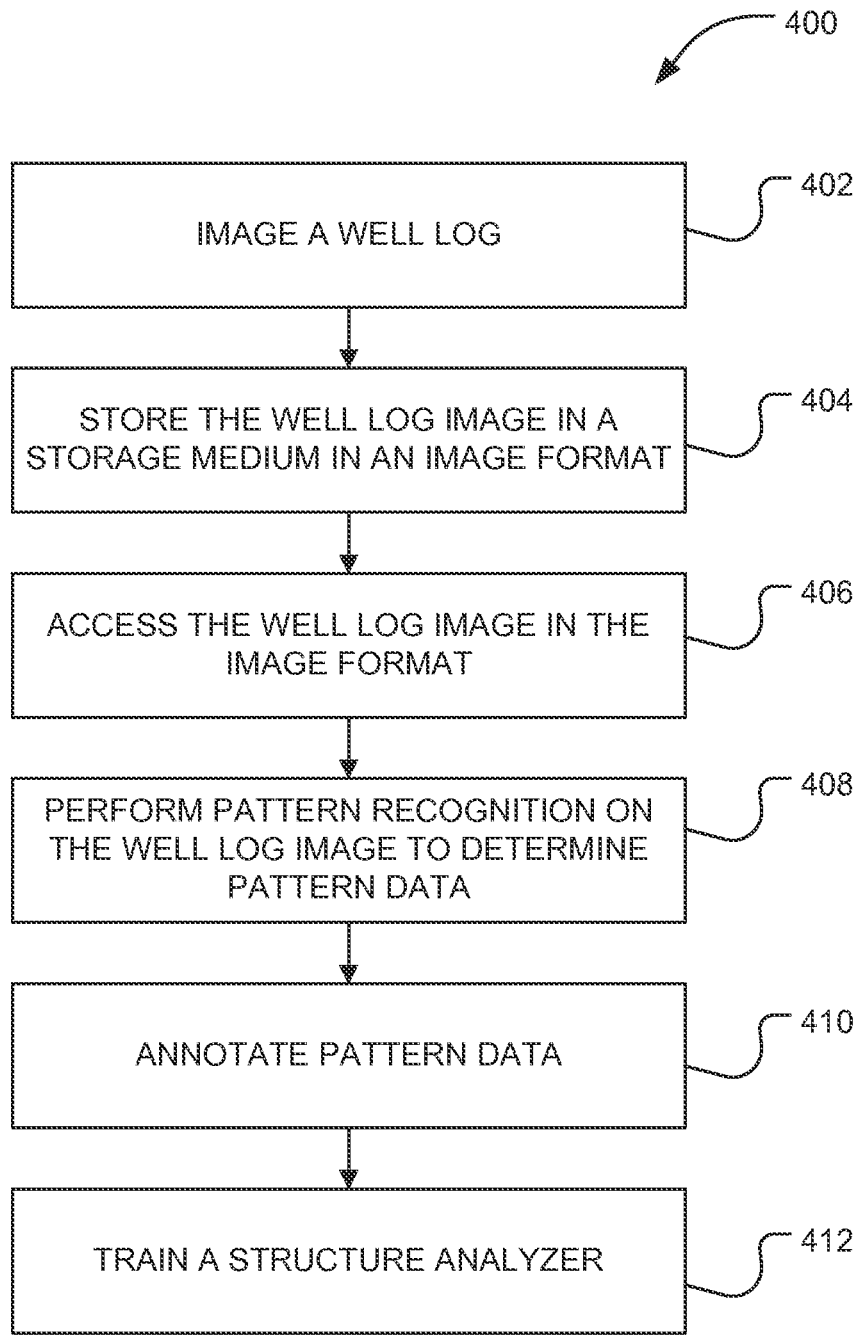

As illustrated at FIG. 4, a method 400 includes training a structure analyzer. As illustrated at 402, a well log is imaged. For example, a raster image scan is provided. Such an image can be stored in a non-transitory storage medium in an image format, as illustrated 404. The well log can be accessed in the image format, as illustrated at 406, and provided for pattern recognition by the pattern recognition engine. Optionally, the well log image can be cleaned or filtered prior to pattern recognition.

Pattern recognition is performed on the well log image to determine pattern data, as illustrated at 408. Such pattern data can be annotated, as illustrated at 410, providing indications of rock type and the demarcation of different structures, or the presence of fluid, or type of fluid within a stratigraphic structure. Such data can be utilized to train the structure analyzer, as illustrated at 412. The structure analyzer can be used to determine structural parameters, such as porosity, density, a measure of fracturing, the presence and type of fluid, or a combination thereof, among others.

Figure 5:
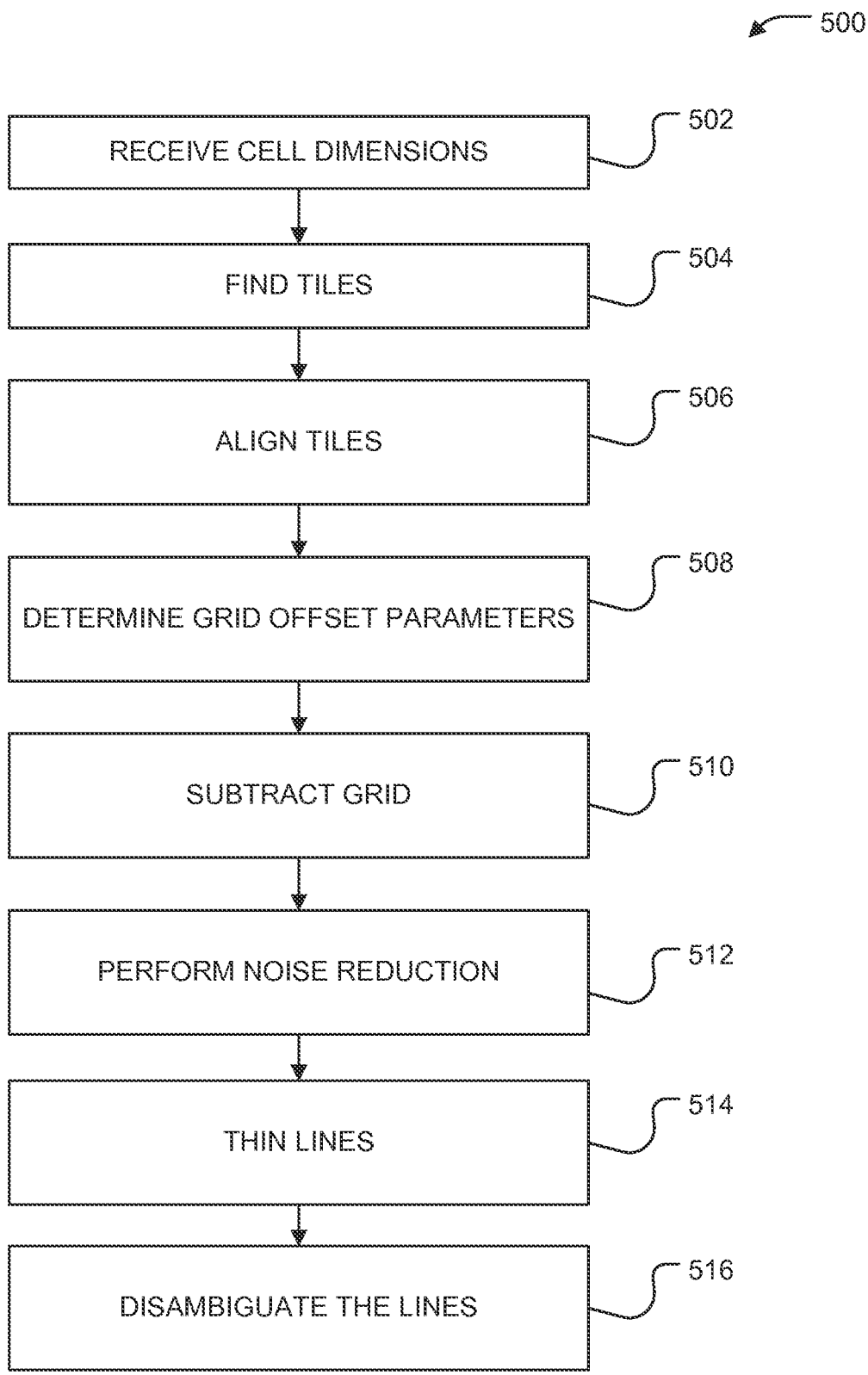

As illustrated in FIG. 5, a method 500 can be used to prepare a well trace of a graph for pattern recognition. In an example, a trace cleaning engine receives cell dimensions, as illustrated at 502. Cell dimensions can be provided by a user. Alternatively, the cell dimensions can be automatically determined from the legend.

A set of tiles are defined along the domain of the graph of the well log image, as illustrated at 504. In particular, the graph can be divided into subdomains along the domain or depth of the graph. Such subdomains can define a set of successive tiles distributed along the domain of the graph.

As illustrated at 506, each of the tiles can be aligned. In particular, the grid associated with each tile can be determined. For example, using a starting point of the grid cell dimensions, the dimensions of the grid can be adjusted to find a high number of grid lines. In particular, the system can seek a high number of darkened pixels by adjusting cell dimensions including domain length, range height, or pitch of the cells.

Once the grids are determined, the grids can be aligned between adjacent tiles, providing grid offset parameters, as illustrated at 508. In particular, the grid offset parameters can provide vertical or horizontal offset values, pitch, or any combination thereof. The vertical or horizontal offset values can be expressed in pixels, for example.

As illustrated at 510, the grid can be subtracted from the image of the graph resulting in clusters separated by blank spaces partially caused by subtraction of the grid. Optionally, noise reduction can be performed following the subtraction of the grid, as illustrated 512. Alternatively, noise reduction can be performed before or following different steps in the process. For example, noise reduction can be performed prior to subtracting the grid.

As illustrated at 514, clusters associated with the contour can be thinned. In particular, line thinning can include decreasing the range values associated with the clusters. For example, the range values can be reduced proportional to the width or thickness of the located gridlines. For example, the range values of each of the clusters can be reduced by moving endpoints at the top and bottom range of the cluster toward a middle pixel of the cluster proportional to a line thickness of the grid. For example, half of a grid line thickness can be removed from the top or bottom of the range of the cluster, providing clusters having high and low range positions closer to a center pixel.

Figure 6:
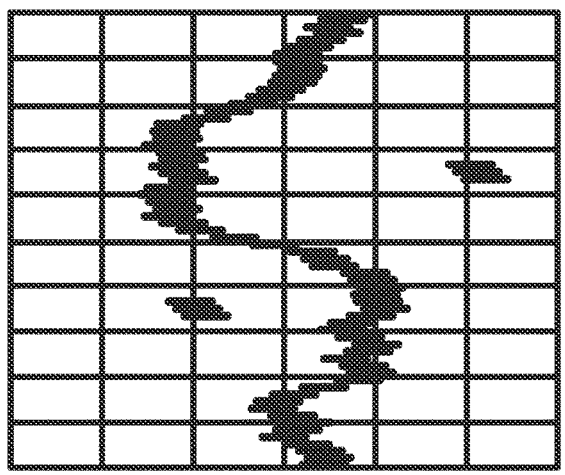
Figure 7:
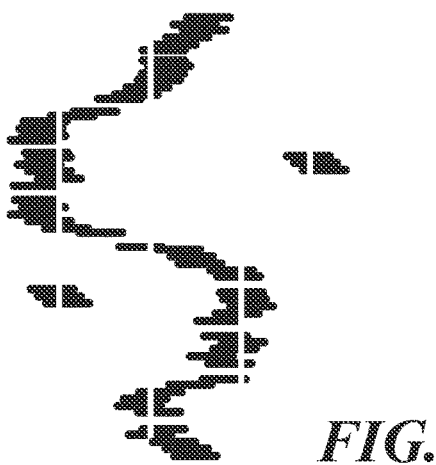
Figure 8:
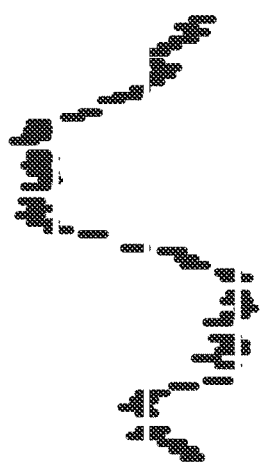

For example, as illustrated in FIG. 6, grid lines within the graph can be located and subtracted to provide clusters, as illustrated in FIG. 7. Following optional noise reduction and line thinning, the clusters can provide a semblance of the contour, as illustrated in FIG. 8.

Returning to FIG. 5, as illustrated at 516, optionally, the lines can be disambiguated, defining contours by determining connections between clusters. Such disambiguation is generally difficult in the context of a noisy graph or where more than one line trace is represented on the same graph. For example, two traces as illustrated in FIG. 9 and FIG. 10 can overlap when plotted within a single graph. For example, clusters resulting from the traces of FIG. 9 and FIG. 10 can overlap and be convoluted, as illustrated in FIG. 11, following noise reduction and grid subtraction. As such, the trace analysis engine can determine the number of lines represented in a graph and determine possible connections between clusters to define a most likely contour associated with each line or trace within the graph.

Figure 12:
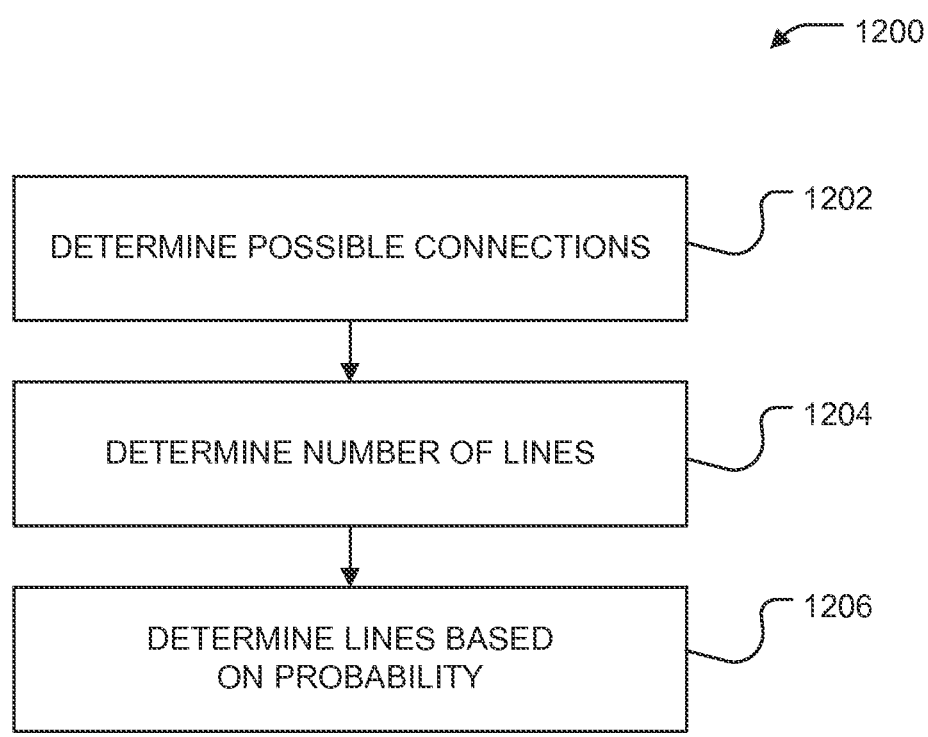
FIG. 12 and FIG. 13 include block flow diagrams illustrating exemplary methods for well trace analysis.

As illustrated in FIG. 12, a method 1200 for disambiguating traces within a graph can include determining possible connections between clusters, as illustrated at 1202. In addition, the trace analysis engine can determine a number of traces lines within the graph, as illustrated at 1204. In particular, a connection between two adjacent clusters can be assigned a probability that can be used to determine which clusters belong to which contour or trace, as illustrated at 1206. For example, the probability can be determined based in part on a distance between clusters. Range and domain components of the distance can be weighted differently or can be treated with similar weight. In another example, the direction of the trace associated with previous sets of clusters or subsequent sets of clusters can be used in part to determine a probability for a given possible connection. In a further example, insulator lines can be defined along the upper and lower ranges of each cluster. The probability of a given connection can be influenced in part based on whether a proposed connection crosses an insulator line. As such, contours along such clusters can be defined based on the higher probability connections between clusters. A number of contours or traces can be determined based on the number of high probability paths including connections between clusters. Such contours can optionally be separated to apply separately to the pattern recognition engine. In particular, the pattern recognition engine may identify a characteristic of a geological structure based on a combination of patterns with a set of contours.

Figure 13:
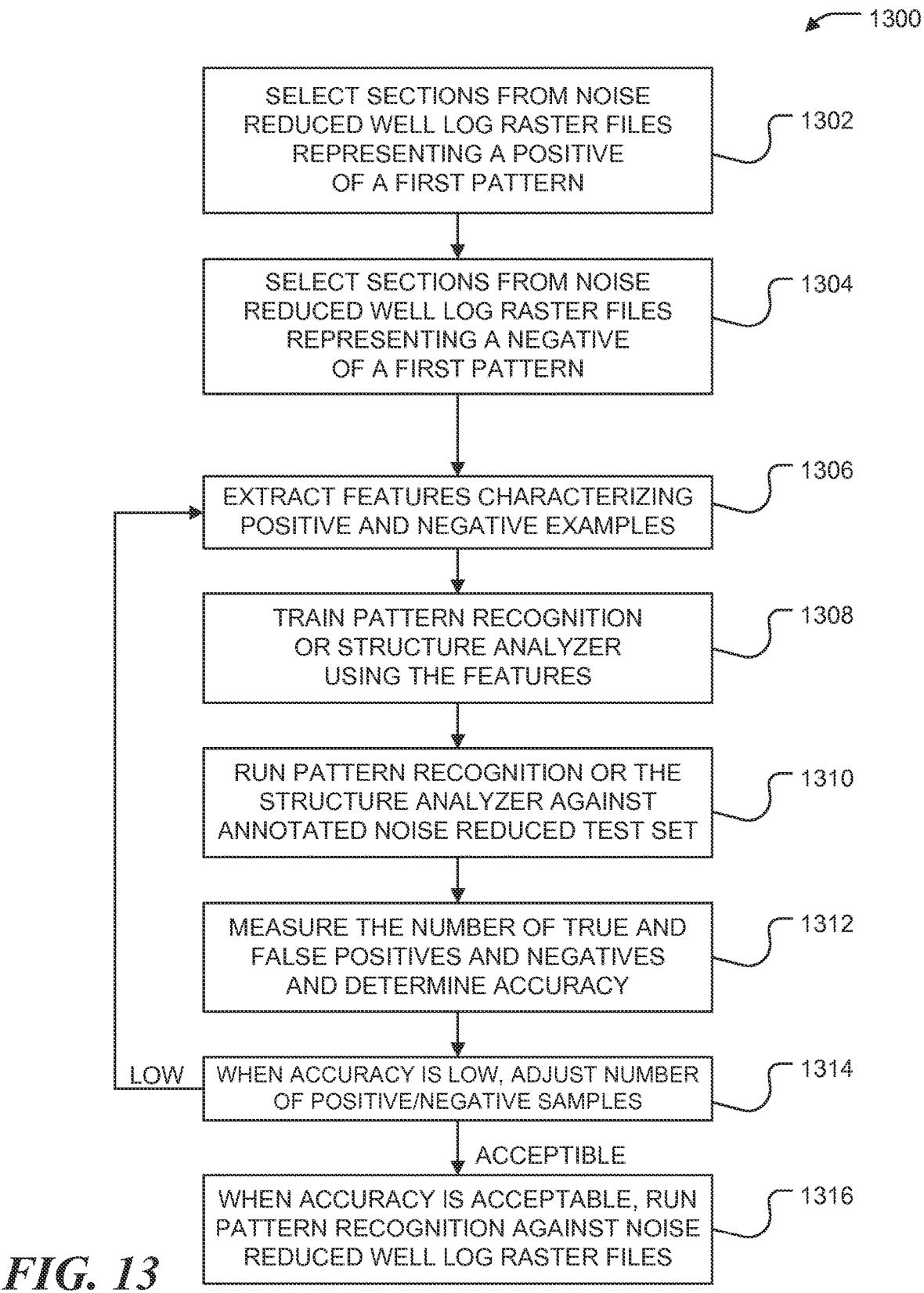

As illustrated in FIG. 13, the pattern recognition engine can be trained using sets of positive and negative samples relating to a pattern of interest (e.g., a pattern characteristic of a geological or stratigraphic formation). For example, as illustrated in a method 1300, sections from noise reduced well log raster files can be selected that represent a positive of a first pattern, as illustrated at 1302. Other sections from noise reduced well log raster files can be selected that represent a negative or absence of the first pattern, as illustrated at 1304. In particular, an individual training the system can select a geological structure of interest and select regions within well log raster files that include patterns characteristic of such a geological structure (positive) or include the pattern indicative of geological structures other than the desired geological structure (negative).

The system extracts features characterizing positive and negative examples of the desired pattern indicative of the geological structure, as illustrated at 1306. For example, such features can include a histogram of gradients, corner points, or leading and trailing edges indicative of transitions to other geological structures, or a combination thereof. Such features can be found on different contours representing traces formed from different well log measuring techniques. The pattern recognition system or the structure analyzer can be trained using the extracted features, as illustrated at 1308.

The pattern recognition system or the structure analyzer can be run against noise reduced test sets of well log raster files, as illustrated at 1310. The test set can include a positive test subset having traces with patterns indicative of the geological structure and can include a negative test subset having traces with patterns not indicative of the geological structure or indicative of a different geological structure. The resulting output can represent a number of correct recognitions of the first pattern and correct recognitions of the absence of the first pattern. The test set can also include an incorrect set of recognizing the pattern (false positives) or an incorrect set of failure to recognize the pattern (false negatives). The number of true and false positives and negatives can be measured and accuracy of the system determined, as illustrated at 1312, for example, relative to the total number of measured results or to the number of true positive or negative results.

When the accuracy is low, the number of positive or negative samples can be adjusted, as illustrated at 1314. For example, additional samples including a positive representation of the first pattern can be added to the training set. In another example, additional negative samples representing an absence of the pattern can be added to the training set. In a further example, some of the positive or negative samples can be removed from the training set. The system can repeat extracting features, as illustrated at 1306, and training of the pattern recognition engine or the structure analyzer can continue, as illustrated 1308.

When the accuracy is acceptable, the trained pattern recognition engine or the structure analyzer can be run against noise reduced well log raster files, as illustrated at 1316, to locate the specified pattern. Such a method can be repeated for a set of desired patterns and the pattern recognition system or structure analyzer can be utilized to analyze additional well log raster files, identifying one or more patterns within the raster files.

Depending upon the training of the structure analyzer, the system can project well related parameters. In an example, a well related parameter includes a projection of production of a fluid or gas from the stratigraphic structure. In another example, the well related parameter can include parameters for completing a well, such as suggested treatments or perforations of the well bore within the stratigraphic structure.

Optionally, the system can determine a field model based on the stratigraphic structured data. In particular, well logs of several wells drilled within the same region can be utilized together in conjunction with relative positioning of the wells to determine a field model. Such field models can provide a three-dimensional characterization of the production structure and further facilitate projection of production data or projection of total available production fluid, such as oil or gas.

In a particular example, a first subset of the data can be used to train the engines and a second subset of the data can be used to test the training of the engines. In another example, the data and annotations associated with the data can be split into several subsets. The engines can be trained serially using a subset followed by testing against another subset, followed by additional training with a third subset and testing with a fourth subset of the data. The subsets can be designated by a user. Alternatively, the subsets can be randomly selected for training the engine.

Pattern recognition or the structure analyzer can define relationships between the data (e.g., well log images for pattern recognition or pattern data for the structure analyzer) and results data (e.g., pattern data for pattern recognition or stratigraphic structure data for the structure analyzer). The relationship can take to form of an algorithm. An exemplary algorithm can take the form of heuristics or the form of algorithms to form regression models, Markov chains, time series models, state space models, Bayesian models, neural networks, or any other appropriate model, or any combination thereof.

In a first aspect, a method of analyzing a well log includes imaging a well log to form a well log image, performing pattern recognition on the well log image to determine pattern data, and determining stratigraphic structure data based on the pattern data.

In an example of the first aspect, the method further includes determining a field model based on the stratigraphic structure data.

In another example of the first aspect and the above examples, the method further includes storing the well log image on a storage medium in an image format. For example, the method can further include accessing the well log image in the image format to perform the pattern recognition. In an additional example, performing the pattern recognition includes performing the pattern recognition on the well log image in the image format.

In a further example of the first aspect and the above examples, the method further includes determining a well completion parameter based on the stratigraphic structure data.

In an additional example of the first aspect and the above examples, the method further includes projecting production data based on the stratigraphic structure data. For example, the production data is associated with oil production data. In another example, the production data is associated with gas production data. In an additional example, the production data is associated with water production data.

In a second aspect, a method of analyzing a well log includes imaging a well log to form a well log image, performing pattern recognition on the well log image to determine pattern data, and training a structure analyzer to determine stratigraphic structure data using the pattern data.

In an example of the second aspect, the method further includes annotating pattern data prior to training the structure analyzer.

In another example of the second aspect and the above examples, the method further includes training the structure analyzer using well completion data.

In a further example of the second aspect and the above examples, the method further includes training the structure analyzer using production data. For example, the production data includes oil production data. In another example, the production data includes gas production data. In an additional example, the production data includes water production data.

In an additional example of the second aspect and the above examples, the method further includes storing the well log image on a storage medium in an image format. In an example, the method further includes accessing the well log image in the image format to perform the pattern recognition. In another example, performing the pattern recognition includes performing the pattern recognition on the well log image in the image format.

In a third aspect, a method of improving production from a stratigraphic structure includes performing pattern recognition on a well log image stored in an image format to determine pattern data, determining stratigraphic structure data using a computer-based structure analyzer based on the pattern data, and projecting well parameters based on the stratigraphic structure data.

In an example of the third aspect, the method further includes imaging a well log to form a well log image, and storing the well log image in a storage medium in an image format.

In a fourth aspect, a system includes a scanner to scan a raster image of a printed well log and a computational system in communication with the scanner to receive the raster image. The computational system includes a pattern recognition analyzer to determine pattern data from the raster image and a structure analyzer to determine stratigraphic structure based on the pattern data.

In an example of the fourth aspect, the system further includes a field model derived from the stratigraphic structure data.

In another example of the fourth aspect and the above examples, the system further includes annotated data associated with a portion of the pattern data.

In a further example of the fourth aspect and the above examples, the system further includes well completion data.

In an additional example of the fourth aspect and the above examples, the system further includes production data.

In a fifth aspect, a method of analyzing a well log includes selecting a training set of trace sections of well log raster files. The test set includes a positive subset of trace sections having a pattern indicative of a geological structure and includes a negative subset of trace sections having a pattern not indicative of the geological structure. The method further includes extracting features characteristic of the positive subset and the negative subset and training with a computational circuitry a pattern recognition engine using the extracted features.

In an example of the fifth aspect, the method further includes selecting a test set of trace sections of well log raster files; performing pattern recognition using the computational circuitry and the trained pattern recognition engine; and measuring a number of false readings associated with the geological structure. For example, the test set includes a positive test subset of trace sections having a pattern indicative of a geological structure and includes a negative test subset of trace sections having a pattern not indicative of the geological structure. In another example, measuring the number of false readings includes measuring a number of false positive readings. In a further example, measuring the number of false readings includes measuring a number of false negative readings. In an additional example, the method further includes determining an accuracy based on a number of readings and the number of false readings. In another example, the method further includes in response to determining the accuracy, adjusting a number of traces in the positive subset or the negative subset; repeating extracting features; and repeating training with the computational circuitry the pattern recognition engine.

In another example of the fifth aspect and the above examples, the features include a histogram of gradients, corner points, leading or trailing edges, or a combination thereof.

In a further example of the fifth aspect and the above examples, the method further includes performing pattern recognition on a well log raster file using the trained pattern recognition engine and detecting the geological structure in response to performing pattern recognition.

In an additional example of the fifth aspect and the above examples, trace sections of the training set of trace sections are noise-reduced trace sections.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of analyzing a well log, the method comprising:
   imaging a printed well log to form a well log image in an image format, the well log including one or more traces;
   determining a number of traces in the well log image, and disambiguating the traces when there are multiple traces;

performing pattern recognition on at least one trace from the well log image in the image format to determine pattern data; and determining stratigraphic structure data based on the pattern data, the stratigraphic structure data including material type.

2. The method of claim 1, further comprising developing a field model based on the stratigraphic structure data.

3. The method of claim 1, further comprising storing the well log image on a storage medium in an image format.

4. The method of claim 3, further comprising accessing the well log image in the image format to perform the pattern recognition.

5. The method of claim 3, wherein performing the pattern recognition includes performing the pattern recognition on the well log image in the image format.

6. The method of claim 1, further comprising determining a well completion parameter based on the stratigraphic structure data.

7. The method of claim 1, further comprising projecting production data based on the stratigraphic structure data.

8. The method of claim 7, wherein the production data is associated with oil production data.

9. The method of claim 7, wherein the production data is associated with gas production data.

10. The method of claim 7, wherein the production data is associated with water production data.

11. A method of analyzing a well log, the method comprising:

imaging a printed well log to form a well log image in an image format, the well log including one or more traces;

determining a number of traces in the well log image, and disambiguating the traces when there are multiple traces;

performing pattern recognition on at least one trace from the well log image in the image format to determine pattern data; and training a structure analyzer to determine stratigraphic structure data using the pattern data, the stratigraphic structure data including material type.

12. The method of claim 11, further comprising annotating the pattern data prior to training the structure analyzer.

13. The method of claim 11, further comprising training the structure analyzer using well completion data.

14. The method of claim 11, further comprising training the structure analyzer using production data.

15. The method of claim 14, wherein the production data includes oil production data.

16. The method of claim 14, wherein the production data includes gas production data.

17. The method of claim 14, wherein the production data includes water production data.

18. The method of claim 11, further comprising storing the well log image on a storage medium in an image format.

19. The method of claim 18, further comprising accessing the well log image in the image format to perform the pattern recognition.

20. The method of claim 18, wherein performing the pattern recognition includes performing the pattern recognition on the well log image in the image format.

* * * * *